United States Patent [19]

Klein

[11] 3,712,665

[45] Jan. 23, 1973

[54] LOCK FOR A REMOVABLE ROOF ATTACHMENT FOR VEHICLES

[75] Inventor: Norbert Klein, 703 Boblingen, Germany

[73] Assignee: Firma Dr.-Ing. h. c. F. Porsche K. G., Stuttgart-Zuffenhausen, Germany

[22] Filed: March 4, 1970

[21] Appl. No.: 16,330

[30] Foreign Application Priority Data

March 6, 1969 Germany.....................P 19 11 379.2

[52] U.S. Cl..........296/137 R, 292/DIG. 5, 292/113, 292/129
[51] Int. Cl. ...............................................B60j 7/16
[58] Field of Search...296/100, 137 R, 137 B, 137 A, 296/137 E, 137 F, 4, 121; 280/150; 292/113, 129, DIG. 5

[56] References Cited

UNITED STATES PATENTS

| 1,879,792 | 9/1932 | Cheney | 292/113 |
| 2,674,480 | 4/1954 | Vigmostad | 296/137 X |
| 3,266,838 | 8/1966 | Heincelman | 292/DIG. 5 |
| 3,036,858 | 5/1962 | Fingerut | 296/102 |

FOREIGN PATENTS OR APPLICATIONS

| 1,162,627 | 8/1969 | Great Britain | 296/137 E |
| 936,989 | 9/1963 | Great Britain | 296/137 |

OTHER PUBLICATIONS

The Society of Automotive Engineers Journal; K. Schwarze; "Unitized Convertible Body Features Beefed-Up Structure;" February, 1962; pp 60–61.

Primary Examiner—Benjamin Hersh
Assistant Examiner—John A. Pekar
Attorney—Craig, Antonelli, Hill

[57] ABSTRACT

A lock for a removable roof attachment of vehicles, especially automotive vehicles, which is clamped against a fixed superstructure such as the roll yoke and wherein the lock cooperates with the removable roof attachment by way of a lever system articulated to a bearing plate. The lever system includes a handle and clamping element and is operative about pivot pins which are parallel to the longitudinal plane of the vehicle. The clamping element cooperates with an elastic member arranged at the roof attachment. The clamping element automatically pivots into a rest position by means of a spring element after releasing the handle. The bearing plate has a V-shaped portion for fixing the clamping element in the rest position.

31 Claims, 4 Drawing Figures

PATENTED JAN 23 1973

Inventor:
NORBERT KLEIN

BY Craig, Antonelli, Stewart & Hill
Attorneys

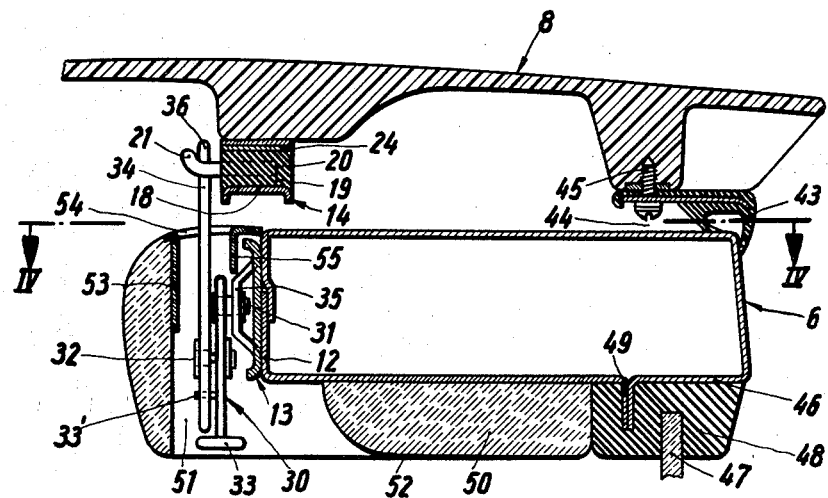
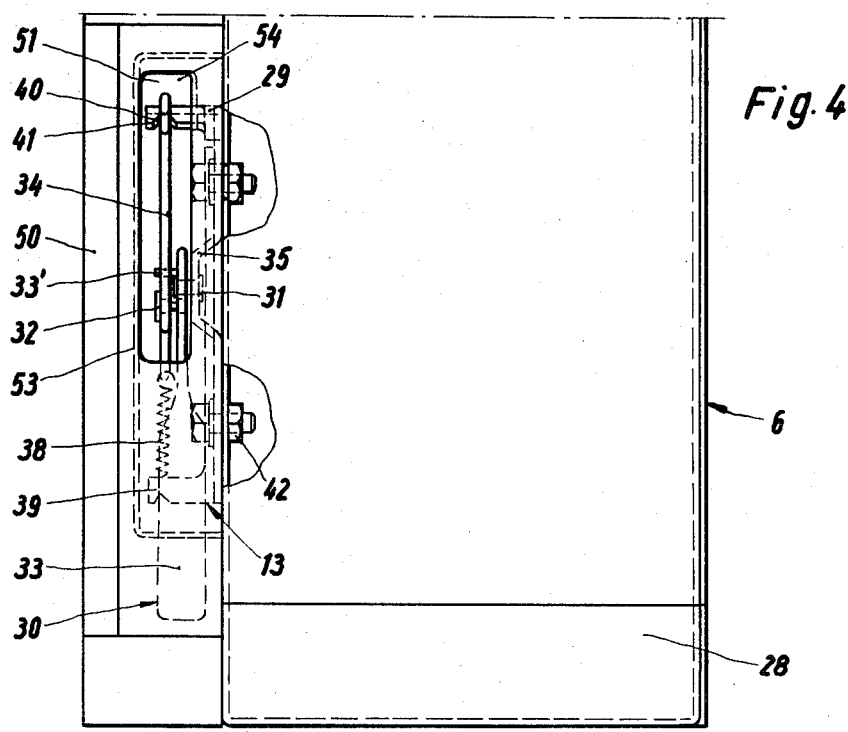

LOCK FOR A REMOVABLE ROOF ATTACHMENT FOR VEHICLES

BACKGROUND OF THE INVENTION

The present invention relates to a lock for a removable roof attachment of vehicles, especially automotive vehicles, and more particularly, to a lock for a removable roof attachment which is clamped against a fixed superstructure and wherein the lock cooperates with the removable roof attachment by way of a lever system articulated to a bearing plate. Thus, it is one of the main purposes of this invention to mount a detachable roof attachment to an automotive vehicle.

Locks for removable vehicle roofs are conventional, as shown in the February, 1962 issue of "SAE Journal" at pp. 54–62, wherein clamping members and operating handles can be actuated about shafts extending at right angles to the longitudinal plane of the vehicle. However, these constructions have the disadvantage that they require a large amount of space for the locking or releasing movement. Consequently, a protected or shielded mounting of these structural components requires measures which are connected with many difficulties. Besides, these locks extend beyond frame portions of the roof, which can result in injuries to persons sitting in the passenger space of the vehicle. Also, the handling of the locks in this type of construction is not very functional.

SUMMARY OF THE INVENTION

It is the aim of the present invention to overcome the underlying problems of providing a lock for a removable roof attachment, which lock absorbs without difficulties the twisting of the superstructure of the vehicle occurring during driving and which is further distinguished by a compact construction, as well as a protected arrangement. In this connection, the releasing and/or closing of the lock is to be as simple as possible.

The underlying problems are solved in accordance with the present invention by providing that the lock holds the roof attachment in position at the fixed structural component of the superstructure by the interposition of elastic members. In this connection, the lever system of the lock, which comprises a handle and a clamping element, is operative about pivot pins oriented in the longitudinal plane of the vehicle.

It is of further advantage herein to have the clamping element of the lock lever system cooperate with an elastic member arranged at the roof attachment. Another elastic member is provided on a substantially horizontally extending wall of the roof attachment and rests on the fixed section of the superstructure. The clamping member of the lock preferably cooperates with a tang of the elastic member attached to the roof attachment. This tang extends in parallel with respect to the central longitudinal plane of the vehicle and is provided with a hook-shaped portion.

It is also advantageous if the clamping element of the lever system automatically pivots into a rest position by means of a spring element after releasing the handle. It is especially advantageous for the bearing or mounting plate of the lock to comprise a V-shaped portion fixing the clamping element, which is in the rest position, in this condition.

In an advantageous further development of the present invention, the handle of the lever system is provided with a driving tang, which is disposed adjacent a rim of the clamping part and cooperates therewith during the locking process. In a preferred embodiment of the present invention, the lock is disposed concealed in a recess of a padded strip for the stationary or fixed part of the superstructure.

In a further construction of the present invention, a structurally rigid insert piece is provided in the area of the lock on a side of the padded strip facing the roof attachment. This insert piece has a passage opening for the clamping element of the lever system. Furthermore, it is advantageous to provide that the insert piece comprises a lug directed into the recess of the padded strip and fashioned as a guide element for the clamping element of the lock.

The essential advantages of the present invention reside, in particular, in that, due to the favorable arrangement and construction of the lever system and of the elastic members, a design is provided which securely absorbs the relative motions of the roof and which requires little space, due to its compact construction. Furthermore, by the provision of the spring and the driving tang, the release and locking of the clamping element can be effected quickly and simply, which has a further advantageous effect on the manipulation of the lock. Also, the lock can be arranged so that it is concealed in this type of design, so that the lock fully satisfies safety requirements.

BRIEF DESCRIPTION OF THE DRAWINGS

These and further advantages, features and objects of the present invention will become more apparent from the following description when taken in connection with the accompanying drawing which shows, for purposes of illustration only, an embodiment in accordance with the present invention, and wherein;

FIG. 3 is a section along line III—III of FIG. 2; and

FIG. 4 is a section along line IV—IV of FIG. 3.

DETAILED DESCRIPTION OF THE DRAWINGS

Figure 1:
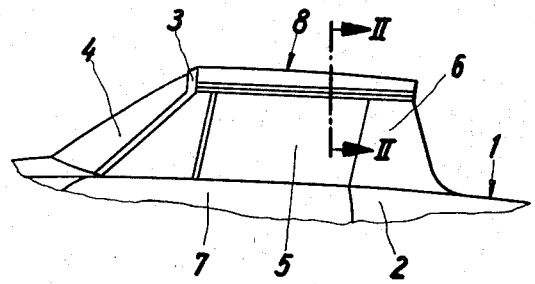
FIG. 1 is a side view of an automotive vehicle in the area of the cover of the passenger compartment.
Figure 2:
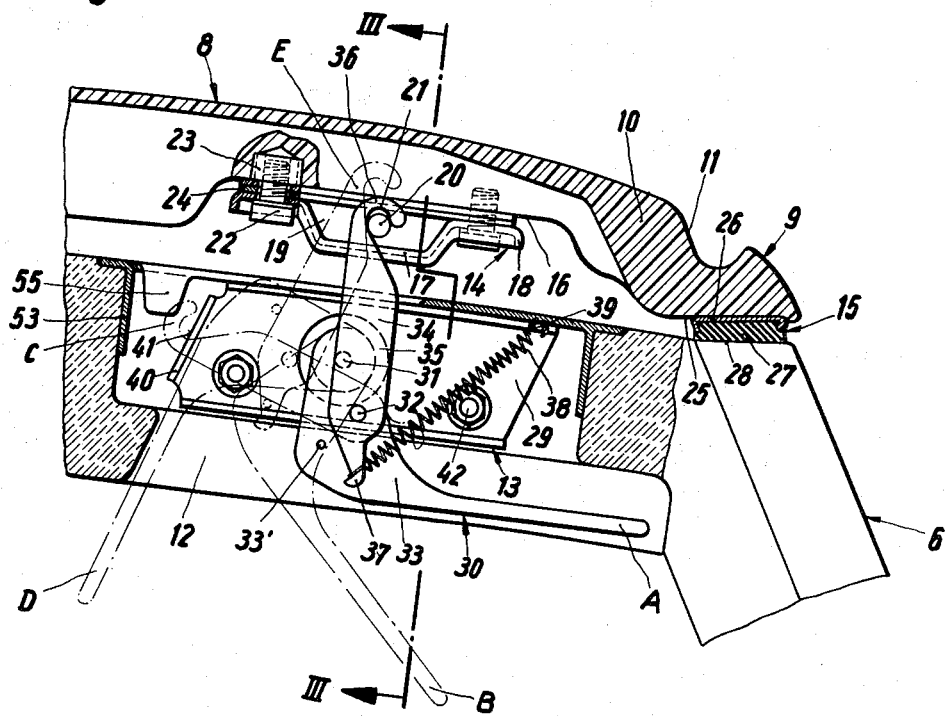
FIG. 2 is a sectional view, on an enlarged scale, of the lock for the roof attachment along line II—II of FIG. 1.

Referring now to the drawings and, in particular, to FIG. 1, the automotive vehicle 1 comprises a superstructure 2. A frame 3 for a windshield 4, as well as a roll yoke or header 6 freely spanning the passenger space 5 are fixedly connected with the superstructure 2. The passenger compartment 5 is accessible through a door 7 and is covered by a roof attachment 8 between the windshield frame 3 and the roll yoke 6. The roof attachment 8, as shown in FIG. 2, is manufactured from a synthetic material resistant to warp and atmospheric influences and has girder-type reinforcements 10 on the lateral edges 9, which reinforcements are provided on their outside with a channel-like groove 11.

The roof attachment 8 is mounted at a fixed part of the superstructure, represented in the embodiment according to the present invention by the roll yoke 6. For this purpose, a lock 13 is provided at an upright portion 12 of the roll yoke 6 and cooperates with the roof attachment 8 with the interposition of elastic members 14, 15. The elastic member 14 is disposed in a depression 16 of the roof attachment 8 and comprises a supporting part 18 provided with a U-shaped section 17. The U-shaped section 17 of the supporting part 18 is filled with a resilient material 19, wherein a tang 20 aligned in the longitudinal plane of the vehicle is embedded, which tang is provided with a hook-shaped portion 21. The elastic member 14 is attached by means of screws 22, threadedly connected with threaded bushings 23 sunk in the material of the roof attachment 8. Shims or lining elements 24, which shims consist of a firm material and serve for compensating for manufacturing tolerances, are provided between the elastic member 14 and the roof attachment 8.

The elastic member 15 is arranged on a wall 25 of the girder-like reinforcement 10 of the roof attachment 8, which wall extends substantially horizontally. Member 15 comprises a rail 26 wherein a resilient body 27 is held. The elastic member 15 rests, with its resilient body 27, against an upper wall 28 of the roll yoke 6 and is attached to the roof attachment 8 by means of screws (not shown in the drawing).

The lock 13 comprises a bearing plate 29 and a lever system designated generally by the numeral 30, which is operative about bearing shafts or pivot pins 31, 32 aligned in the longitudinal plane of the vehicle. The lever system 30 is formed by a handle 33 and a clamping element 34. The handle 33 is rotatably articulated to a bulge 35 of the bearing plate 29 by means of the bearing shaft 31. Furthermore, the handle 33 is provided with a driving tang 33' disposed adjacent to the clamping element 34. The clamping element 34 of the lever system 30 of the lock 13 is rotatably connected with the handle 33 by means of the bearing shaft 32 and has hook-shaped terminal portions 36, 37 on the opposite ends thereof. The hook-shaped terminal portion 36 of the clamping element 34 cooperates, in the closed position of the lock 13, with the tang 20 of the elastic member 14, whereas a spring element 38 engages the opposed portion 37. The spring element 38 is formed by a tension spring which cooperates at its free end with a flange 39 of the bearing plate 29.

As shown in FIG. 4, the bearing plate 29 furthermore comprises a V-shaped section 41 on an obliquely extending wall 40 for fixing the clamping element 34. The lock 13 is mounted to the roll yoke 6 in a conventional manner by means of, for example, releasable elements 42. According to FIG. 3, the roll yoke 6 is covered by the roof attachment 8, which has a sealing strip 43 in a zone facing the end of the vehicle. The sealing strip 43 covers a gap 44 between the roll yoke 6 and the roof attachment 8 and is held in position thereat by means of, for example, screws 45. Oppositely to the sealing strip 43, a disk member 47 is provided on an inner wall 46 of the roll yoke 6. The disk 47 is held in a sealing element 48 surrounding a spot welding flange 49 of the roll yoke 6. The roll yoke 6 is provided with a padded strip 50 enclosing the upright section 12 and the inner wall 46. In the zone of the lock 13, the padded strip 50 has a recess 51, so that this component is mounted in such a manner that the passengers of the vehicle are protected. From the inner wall 46 of the roll yoke 6 to a horizontal boundary edge 52 of the padded strip 50, the recess 51 is widened, thus making the lock 13 easily accessible. On a side of the padded strip 50 facing the roof attachment, an insert piece 53 is provided having a passage opening 54 for the clamping part 34. The insert piece 53 consists of a firm or rigid material, which is attached to the padded strip 50 by cementing or the like, and comprises a lug 55 extending into the recess 51 and fashioned as a guide member for the clamping element 34. Furthermore, the insert piece 53 imparts rigidity to the padded strip 50 in the zone of the recess 51.

The function of the lock 13 can best be explained in conjunction with FIG. 2. In FIG. 2, the lock 13 is illustrated in the locked position (A) wherein the lever system 30 assumes the deadcenter position. In order to release the lock, the handle 33 is moved into the opening position (B), whereby the spring-loaded clamping element 34 is automatically pivoted into a rest position (C). In the rest position (C), the clamping element 34 is fixed in position by the V-shaped section 41, as shown in FIG. 4, so that an undesired change in position of this structural component is counteracted. In order to close the lock 13, the handle 33 is moved into position (D). Thereby, the clamping element 34, along with its hook-shaped portion 36, is brought into a position (E) aligned with the bearing pin 20 of the elastic member 14, by way of the driving tang 33' of the handle 33. In this position, the clamping element 34 is held by hand, and the handle 33 is pressed into the closing position (A), whereby the hook-shaped portion 36 of the clamping element 34 and the tang 20 of the elastic member 14 cooperate.

While I have shown and described only one embodiment in accordance with the present invention, it is to be understood that the same is susceptible of numerous changes and modifications as will be apparent to one of ordinary skill in the art, and I, therefore, do not wish to be limited to the details shown and described herein, but intend to cover all such changes and modifications within the scope of the present invention.

I claim:

1. Lock for a removable roof attachment of a vehicle, particularly an automotive vehicle having a roof attachment adapted to be clamped to a fixed part of the vehicle superstructure, said lock comprising: bearing plate means fixed to one of said roof attachment and said fixed part, lever means operatively articulated to said bearing plate means by way of pivot support shaft means extending in the longitudinal driving direction of the vehicle whereby pivotal movement of said lever means is only about axes parallel to said longitudinal direction, said lever means including clamping means for operatively engaging the other of said roof attachment and said fixed part, and an elastic member positioned between said clamping means and said roof attachment such that clamping forces between said clamping means and said roof attachment are transferred by way of said elastic member, wherein the elastic member is provided with a tang portion extending substantially parallel to a central longitudinal plane of the vehicle and having a hook-shaped portion, and wherein the clamping means operatively cooperates with the tang portion.

2. Lock according to claim 1, wherein further elastic member is provided on a substantially horizontally extending wall of the roof attachment for resting on the fixed part of the superstructure.

3. Lock according to claim 2 wherein a roll yoke constitutes the fixed part of the superstructure.

4. Lock according to claim 1, wherein said elastic means includes an elastic member provided on a substantially horizontally extending wall of the roof attachment for resting on the fixed part of the superstructure.

5. Lock according to claim 1, wherein means are provided for automatically pivoting the clamping means back into a rest position out of engagement with the said other of said roof attachment and said fixed part after release of a handle provided on the lever means.

6. Lock according to claim 5, wherein the automatic pivoting means includes spring means.

7. Lock according to claim 1, wherein the bearing plate means includes a V-shaped portion for supporting the clamping means in the unlocked position.

8. Lock according to claim 7, wherein the lever means includes a handle operatively associated with the clamping means.

9. Lock according to claim 8, wherein means are provided for automatically pivoting the clamping means back into a rest position after release of the handle.

10. Lock according to claim 9, wherein the automatic pivoting means includes spring means.

11. Lock according to claim 1, wherein said lever means includes a handle and wherein a driving tang is provided on the handle adjacent an edge of the clamping means so as to cooperate therewith during the locking operation.

12. Lock according to claim 11, wherein means are provided for automatically pivoting the clamping means back into a rest position out of engagement with the said other of said roof attachment and said fixed part after release of a handle provided on the lever means.

13. Lock according to claim 12, wherein the automatic pivoting means includes spring means.

14. Lock according to claim 11, wherein the bearing plate means includes a V-shaped portion for supporting the clamping means in the unlocked position.

15. Lock according to claim 1, wherein the fixed part of the superstructure is provided with a padded strip having a recess for concealing the lock structure to protect passengers from engaging said lock structure.

16. Lock according to claim 15, wherein a roll yoke constitutes the fixed part of the superstructure.

17. Lock according to claim 15, wherein the lever means includes a handle operatively associated with the clamping means.

18. Lock according to claim 17, wherein a driving tang is provided on the handle adjacent an edge of the clamping means so as to cooperate therewith during the locking operation.

19. Lock according to claim 18, wherein a structurally rigid insert member is provided in the area of the lock on a side of the padded strip facing the roof attachment.

20. Lock according to claim 19, wherein the insert member has a passage opening for the clamping means.

21. Lock according to claim 19, wherein the insert member includes a lug portion directed into the recess of the padded strip, the lug serving as a guide member for the clamping means.

22. Lock according to claim 21, wherein the insert member has a passage opening for the clamping means.

23. Lock according to claim 1, wherein spring means are provided for automatically pivoting the clamping means back into a rest unclamped position after release of the handle.

24. Lock according to claim 1, characterized in that said bearing plate means is fixed to said fixed part.

25. Lock according to claim 24, characterized in that said lever means further includes a handle means, and in that said pivot support shaft means includes a first and second pivot pin spaced from one another, said first pin pivotally connecting said handle means and said clamping means, said second pin pivotally connecting said clamping means to said bearing plate means whereby a toggle clamping effect is formed when said handle means is moved into the clamping position.

26. Lock according to claim 1, characterized in that said lever means further includes a handle means, and in that said pivot support shaft means includes a first and second pivot pin spaced from one another, said first pin pivotally connecting said handle means and said clamping means, said second pin pivotally connecting said handle means to said bearing plate means whereby a toggle clamping effect is formed when said handle means is moved into the clamping position.

27. Lock according to claim 1, characterized in that said elastic member includes a mass of elastic material, and in that said tang portion is constructed as a pin extending out of said mass of elastic material, said clamping means directly engaging said pin when in the clamped condition.

28. Lock for a removable roof attachment of a vehicle, particularly an automotive vehicle having a roof attachment adapted to be clamped to a fixed part of the vehicle superstructure, said lock comprising: bearing plate means fixed to one of said roof attachment and said fixed part, lever means operatively articulated to said bearing plate means by way of pivot support shaft means extending in the longitudinal driving direction of the vehicle whereby pivotal movement of said lever means in only about axes parallel to said longitudinal direction, said lever means including clamping means for operatively engaging the other of said roof attachment and said fixed part, and elastic means arranged between said roof attachment and said fixed part for resiliently cushioning forces transferred between said roof attachment and said fixed part, wherein said lever means further includes a handle means, wherein said pivot support shaft means includes a first and second pivot pin spaced from one another, said first pin pivotally connecting said handle means and said clamping means, said second pin pivotally connecting said handle means to said bearing plate means whereby a toggle clamping effect is formed when said handle means is moved into the clamping position, wherein said clamping means includes a clamping end portion and a return end portion disposed at opposite sides of said first pivot pin, said clamping end portion being directly clampingly engageable with said other of said roof attachment and said fixed part when said handle means is in said clamping position, said return end portion being attached to a return spring mounted on said bearing plate means such that said clamping means is pivoted to a rest position when said handle means is in a position other than the clamping position, and wherein said bearing plate means includes stop means positioned to engage said clamping means adjacent the clamping end portion thereof to retain the clamping means in said rest position.

29. Lock according to claim 28, wherein the clamping means cooperates with an elastic member forming part of the elastic means, said elastic member being arranged at the roof attachment, and wherein another of the elastic members is provided on a substantially horizontally extending wall of the roof attachment for resting on the fixed part of the superstructure.

30. Lock according to claim 29, wherein the elastic member arranged at the roof attachment is provided with a tang portion which extends substantially parallel to the central longitudinal plane of the vehicle and has a hook-shaped portion, and wherein the clamping means operatively cooperates with the tang portion.

31. Lock according to claim 28, further comprising an elastic member including a pin extending out of a mass of elastic material, said clamping means directly engaging said pin when in the clamped condition.

* * * * *